Aug. 29, 1939.  W. BRAUNSCHWEIG  2,171,231
ELECTRIC CONDENSER
Filed Jan. 25, 1936
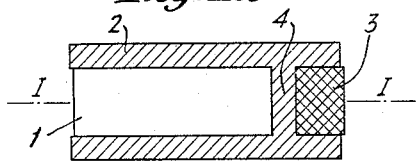
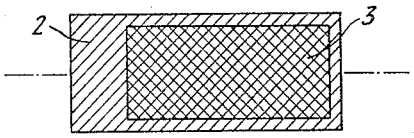
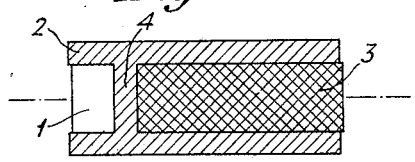
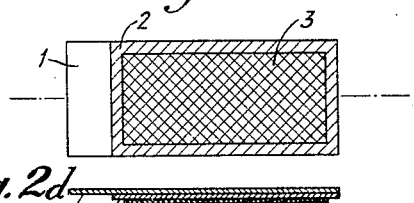
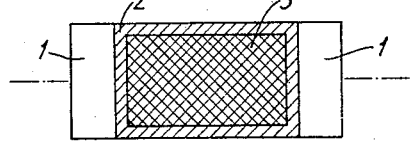
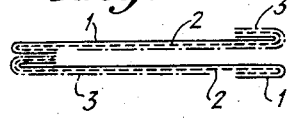
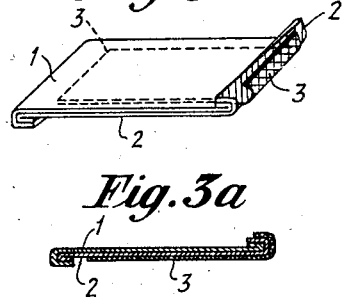
INVENTOR.
WERNER BRAUNSCHWEIG
BY
ATTORNEY.

Patented Aug. 29, 1939

2,171,231

UNITED STATES PATENT OFFICE 2,171,231

ELECTRIC CONDENSER

Werner Braunschweig, Berlin, Germany, assignor to Telefunken Gesellschaft für Drahtlose Telegraphie m. b. H., Berlin, Germany, a corporation of Germany Application January 25, 1936, Serial No. 60,817
In Germany February 25, 1935

2 Claims. (Cl. 175—41)

This invention relates to a new and novel condenser construction having elements consisting of aluminum foil or lamination oxidized throughout its surface.

It is known from the prior art to use tenuous oxide films upon aluminum foil to act as a dielectric so as to obtain a capacitive action. It is also known that the best arrangement from an electrical and thermal viewpoint is to apply upon the oxide film a further layer of metal in such a way that the oxidized foil being metallized upon its oxidized surface, as it were, will form and constitute a condenser unit or elementary condenser which is independent of external pressure or other stratification phenomena.

However, serious difficulties arise whenever an attempt is made to assemble from such oxidized aluminum foils known in the prior art and representing elementary construction units a condenser by means of stratification comprising parallel connected condenser coats.

According to the invention, easy parallel assembling is possible if the constituent foils or lamellae are so arranged and shaped that upon parts of the oxide layer additional metallic coats are applied in such a manner that upon each face of the constituent element both a bare aluminum surface as well as an additional metallized surface acting as coats of opposite polarity are disposed.

A number of exemplified embodiments of the basic idea of the invention are illustrated in the accompanying drawing in which—

Figure 1a is a top view of a single foil dielectric and conductor forming a condenser unit, Fig. 1b is a bottom view of Fig. 1a, and Fig. 1c is a section of Figures 1a and 1b, the section being taken on line I—I of Fig. 1a, Fig. 2 is a section of another embodiment of a single condenser unit, Fig. 2a is a bottom view of Fig. 2, Fig. 2b is a bottom view of Fig. 2d, Fig. 2c is a bottom view of a modification of Fig. 2e, Fig. 2d is a section of Fig. 2b, Fig. 2e is a section of Fig. 2c, Fig. 3 is a perspective view of Figs. 2 and 2a, showing a partial bend at the ends of the condenser unit, Fig. 3a is a section of Fig. 3, showing a complete bend at the ends of the condenser unit, Fig. 4 is a diagram showing two condenser units arranged with their ends of the same polarity connected together, Fig. 5 is a diagram showing two single condenser units arranged with their ends of opposite polarity connected together.

Referring now in detail to Figs. 1a, 1b and 1c, an aluminum foil which has been partially oxidized upon both of its flat faces excepting at the points marked 1 is shown. On top of the partially oxidized surface or coated insulated side area margins 2, a metallized layer 3 is provided by some suitable process upon both sides. One electrode will then consist of the surfaces 1 of the two flat faces, while the other electrode consists of the conducting surfaces 3—3. The two electrodes 1 and 3 are separated by the creepage paths 4—4 formed by the extension of oxidized surface 2. This assembly then forms a single condenser element.

When assembling a condenser comprising a plurality of superposed single condenser elements of the kind hereinbefore described, they are so placed on top of one another that the insulating creepage paths 4 of contiguous elements will come to register.

According to another embodiment, the construction of unit condenser elements can be made by bending over the edges of originally planar lamellae formed roughly in a way as shown in section by Figs. 2, 2a, 2b, and 2e. These forms of lamellae have this joint characteristic feature that they are oxidized only on one flat side wholly or partly, and that portions of the oxidized surface are then metallized. The way a lamella or foil Fig. 2a forms a condenser construction element or unit is shown in Fig. 3 (which is a perspective view of a construction element of Fig. 2 with ends bent over). Fig. 3a shows a sectional elevation of finished condenser element. For instance, if a lamellae of the type shown in Fig. 2 is so bent over that the left-hand edge is bent in downward direction, and the right-hand edge upwardly, it will be seen that upon each flat face of the construction element thus made there is both a bare aluminum surface portion as well as a metallized surface portion, the two being separated by an insulating creepage space. When assembling a stack condenser, pairs of adjacent elementary parts may be so superposed that either the contact points of similar polarity can make contact (see Fig. 4) or else that the contact points of different metallic polarity are in connection and contact with one another (Fig. 5).

In still another embodiment, the condenser elements may be constructed as shown by Fig. 2b, wherein one end of the metallic foils is entirely bare on both faces to provide a greater contact surface at one of the ends. Also, in Fig. 2c, a condenser element is shown wherein both ends of the metallic foil are entirely bare on a portion of both faces to provide greater contact surfaces at both of the ends.

I claim:

1. A condenser element comprising a sheet of aluminum which serves as an electrode, a major portion of one surface of said sheet having an oxide coating forming a condenser dielectric portion, a minor portion of said surface being uncoated, a major portion of said oxide coating having a metallized layer serving as the other condenser electrode, the other surface of said sheet having a minor portion of its surface coated with oxide and a major portion uncoated.

2. A condenser element comprising a metallic sheet which serves as an electrode, a major portion of one surface of said sheet having an insulating coating forming a condenser dielectric portion, a minor portion of said surface being uncoated, a major portion of said insulating coating having a metallized layer serving as the other condenser electrode, the other surface of said sheet having a minor portion of its surface coated with insulation and a major portion uncoated, the major and minor portions of said coated and uncoated portions of one surface being located opposite the minor and major portions respectively of the other surface.

WERNER BRAUNSCHWEIG.